United States Patent [19]

Berkey

[11] 4,453,961

[45] Jun. 12, 1984

[54] METHOD OF MAKING GLASS OPTICAL FIBER

[75] Inventor: George E. Berkey, Corning, N.Y.

[73] Assignee: Corning Glass Works, Corning, N.Y.

[21] Appl. No.: 402,056

[22] Filed: Jul. 26, 1982

[51] Int. Cl.³ .......................................... C03B 37/025
[52] U.S. Cl. .................................... 65/3.12; 65/18.2; 65/31; 65/32
[58] Field of Search ...................... 65/3.11, 3.12, 18.2, 65/31, 32

[56] References Cited

U.S. PATENT DOCUMENTS

| | | | |
|---|---|---|---|
| 4,251,251 | 1/1981 | Blankenship | 65/3.12 |
| 4,257,797 | 3/1981 | Andrejco et al. | 65/3.12 |
| 4,298,365 | 11/1981 | Bailey et al. | 65/3.12 |
| 4,344,670 | 8/1982 | Blankenship | 65/3.11 X |

Primary Examiner—Richard V. Fisher
Attorney, Agent, or Firm—W. J. Simmons, Jr.

[57] ABSTRACT

A glass optical waveguide preform is formed by depositing first and second coatings of glass soot on a mandrel. The characteristics of the first coating are such that it can ultimately form the core of an optical fiber. The core-clad diameter ratio of the preform is greater than that necessary to provide the desired core-clad diameter ratio of the resultant fiber. The mandrel is removed and the porous preform is consolidated. The preform aperture is etched, rinsed and dried. One end of the preform is heated and pinched to close the aperture. The aperture is evacuated, and the remaining end of the preform is heated, the corresponding end of the aperture being caused to close. An intermediate fiber is drawn from the resultant consolidated preform, the entire aperture being closed during drawing due to the low pressure within the aperture. The intermediate fiber is severed into sections, each of which functions as a mandrel for the deposition of a further coating of cladding soot. The resultant composite article is consolidated and drawn into an optical fiber.

13 Claims, 7 Drawing Figures

METHOD OF MAKING GLASS OPTICAL FIBER

BACKGROUND OF THE INVENTION

The present invention relates to an improved method of forming a soot preform from which optical waveguide fibers can be made.

Certain glass making processes, particularly vapor deposition processes, have been commonly employed in the formation of optical waveguide blanks. In one such process, referred to as the flame hydrolysis or outside vapor deposition process, a plurality of constituents in vapor form are entrained in a gaseous medium in predetermined amounts and thereafter are oxidized in a flame to form particulate matter called soot. A first soot coating of uniform or radially varying composition is applied to the surface of a rotating cylindrical mandrel or starting member. After the first coating of soot is deposited to form the core glass, the composition of the soot is changed to form a cladding glass coating. Heretofore, the mandrel was usually removed, and the soot preform was sintered to form a consolidated, clear glass draw blank having an aperture therethrough. Acid was flowed through the aperture to etch defects from the aperture forming surface. The resulting tubular draw blank was heated to a temperature at which the material had a low enough viscosity for drawing and was drawn to collapse the hole therein and form a fiber having the desired dimensions. Various methods employing such a flame hydrolysis technique for forming glass optical waveguide fibers are taught in U.S. Pat. Nos. Re. 28,029; 3,711,262; 3,737,293; 3,823,995 and 3,826,560, the latter two patents being directed to the formation of gradient index waveguides.

The rate of drawing a fiber from a preform having an aperture is limited by the rate at which the aperture will close during the drawing process. Also, the surface of an open preform aperture can become contaminated, especially during the high temperature fiber drawing operation.

A solution to the aforementioned problems is disclosed in U.S. Pat. No. 4,251,251 (Blankenship) wherein the preform aperture closes during consolidation due to the predetermined relative viscosities of the core and cladding materials. The Blankenship patent teaches that care must be taken to minimize damage done to the preform while removing the mandrel since such damage can result in the formation of seeds at the center of the resultant consolidated draw blank. Damage to the aperture surface is especially troublesome in the practice of the method of the Blankenship patent since defects cannot be etched from that surface after consolidation, the aperture having been closed during that step. Damage to the aperture surface can be reduced by forming a soft parting layer of carbon soot on the surface of the mandrel and thereafter building up the preform with glass soot. U.S. Pat. No. 4,298,365 teaches a method which further facilitates the closing of the soot preform aperture during consolidation. A thin stratum of very low viscosity glass soot is initially applied to the surface of a mandrel. First and second coatings of glass soot are then deposited on the surface of the thin stratum in accordance with the teachings of the aforementioned Blankenship patent. The mandrel is removed, and the soot preform is subjected to a high temperature whereby it is consolidated to form a dense glass blank. The glass surface tension and the relative viscosities of the inner and outer portions of the preform cause the aperture to close during the consolidation process. The thin stratum, which may include $P_2O_5$ or $B_2O_3$, smoothes over the damage caused by removing the mandrel and reduces or even eliminates seed formation at the axis of the resultant glass blank.

However, the use of $P_2O_5$ or $B_2O_3$ to facilitate hole closing is detrimental to achieving ultra low loss attenuation at long wavelengths. Fibers having cores that are free from $P_2O_5$ or $B_2O_3$, eg. fibers having cores consisting of $GeO_2$-doped silica, are preferred for low-loss operation in the infrared region of the spectrum. The aperture in a preform having a $GeO_2$-$SiO_2$ core region does not close during consolidation.

SUMMARY OF THE INVENTION

It is therefore an object of the present invention to provide a method of preventing the contamination of the aperture-forming wall of a consolidated optical fiber preform. Another object is to provide an improved method of forming an optical fiber by a technique which requires the deposition of particulate material on the surface of a mandrel.

Briefly, the method of the present invention comprises applying at least one coating of particulate glass to the outside peripheral surface of an elongated mandrel. The mandrel is removed to form a porous preform having a longitudinal aperture therethrough. The porous preform is heated to form an elongated, consolidated glass preform having an aperture therethrough. One end of the aperture is then caused to close. The aperture is evacuated, and the other end is closed. The resultant article can be immediately subjected to further processing or can be stored without risk of contaminating the walls of the aperture.

In the event that the consolidation step leaves a devitrified layer on the walls of the aperture, the devitrified layer can be removed by etching. The etching step is particularly advantageous if the preform is to be used for producing optical waveguide fibers since the devitrified layer can result in light scattering seeds.

The step of consolidating the porous glass preform is preferably performed with a capilliary tube at one end of the preform aperture. A drying gas flowed into the aperture initially exhausts through the capilliary tube. After the capilliary tube closes due to the high consolidation temperature, the drying gas flows through the preform interstices. After consolidation, the closed end of the preform is severed to permit the etchant to flow freely through the aperture. The etching step is followed by rinsing and drying.

To form an optical waveguide from the consolidated glass preform, it may be directly drawn into an optical fiber, or it may be drawn into a large diameter intermediate fiber upon which additional cladding material may be added. In either process, the low pressure within the preform aperture with respect to that on the outer surface thereof assists the aperture closing process.

DESCRIPTION OF THE PREFERRED EMBODIMENT

It is to be noted that the drawings are illustrative and symbolic of the invention, and there is no intention to indicate scale or relative proportions of the elements shown therein. Further, it is to be noted that the present invention expressly contemplates both single mode and multimode waveguides regardless of any specific description, drawing, or example set out herein. The present invention also contemplates optical waveguides having cores with either a constant or gradient index of refraction. In the case of gradient index optical waveguides the cladding may be the outer portion of the core, or it may be a layer whose refractive index is lower than that of the adjacent core material by such an amount that there is an abrupt change in refractive index at the core-cladding interface.

Figure 1:
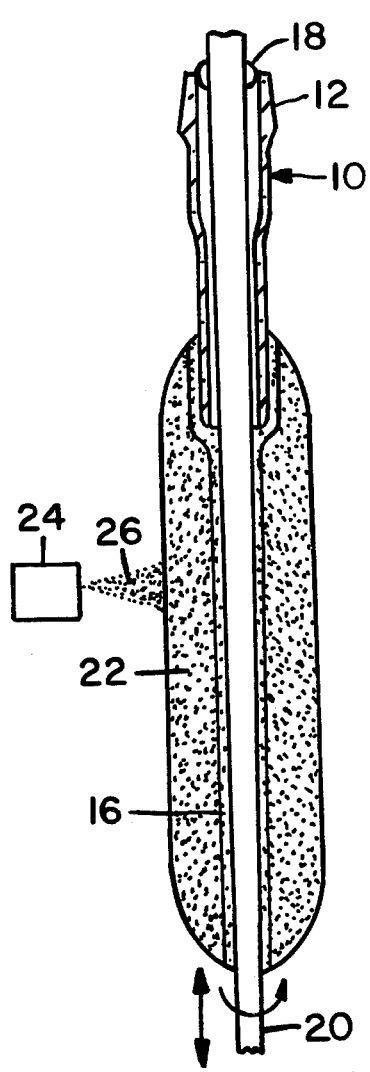
FIGS. 1 and 2 illustrate the application of successive coatings of glass soot to a mandrel.
Figure 2:
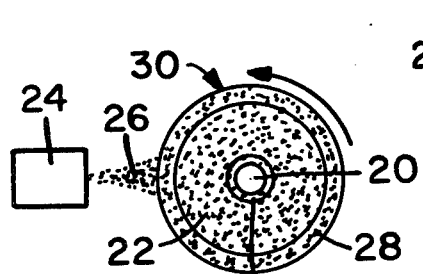

A porous preform may be formed in accordance with the method illustrated in FIGS. 1 and 2. A handle 10 of the type disclosed in U.S. Pat. No. 4,289,522 may be employed. Handle 10 is a tubular member having a ground glass joint 12 at the one end thereof. The large diameter end of a tapered mandrel 20 extends through handle 10 and is secured thereto by shims 18. The ends of the mandrel are mounted in a lathe where it is rotated and translated as indicated by the arrows. The mandrel may be provided with a layer of carbon soot to facilitate removal of the soot preform. Fuel gas and oxygen or air are supplied to burner 24 from a source (not shown). This mixture is burned to produce a flame 26 which is emitted from the burner. A gas-vapor mixture is oxidized within flame 26 to form a soot stream which is directed toward mandrel 20. Suitable means for delivering the gas-vapor mixture to the burner are well known in the art; for an illustration of such means reference is made to U.S. Pat. Nos. 3,826,560, 4,148,621 and 4,173,305. One or more auxilliary burners (not shown) may be employed to direct a flame toward one or both ends of the soot preform during deposition to prevent breakage. This method can be employed to produce any type of core index profile including step index and gradient index. For an illustration of suitable burners, reference is made to U.S. Pat. Nos. 3,565,345 and 4,165,223. Soot deposition means 24 may also comprise nozzles such as those disclosed in U.S. Pat. No. 3,957,474 which emit reactant vapors which are heated by means such as a laser beam to form a soot stream.

A stratum 16 of silica soot may be initially deposited on the mandrel to create a compressive layer at the aperture forming surface of the resultant consolidated glass preform. A coating 22 of glass soot is deposited on stratum 16. A second coating 28 of soot may be applied over the outside peripheral surface of first coating 22 as shown in FIG. 2. Each of the coatings 22 and 28 is generally formed of a plurality of layers. In accordance with well-known practice the refractive index of coating 28 is made lower than that of coating 22 by changing the composition of the soot being produced in flame 26. This can be accomplished by changing the concentration or type of dopant material being introduced into the flame, or by omitting the dopant material. Mandrel 20 is again rotated and translated to provide a uniform deposition of coating 28. The composite structure including first coating 22 and second coating 28 constitutes porous preform 30.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core glass can consist of fused silica doped with a material to increase its refractive index.

Many suitable materials have been used as a dopant alone or in combination with each other to increase the refractive index of fused silica. These include, but are not limited to, titanium oxide, tantalum oxide, aluminum oxide, lanthanum oxide, phosphorus oxide and germanium oxide. A core of germania doped fused silica is advantageously employed as a fiber core material since the resultant fiber exhibits low loss characteristics which extend to around 1600 nm. The cladding may be pure fused silica or silica doped with an oxide the amount of which is such that the cladding refractive index is lower than that of the core. The cladding could be doped with an oxide such as boron oxide which provides a refractive index slightly lower than that of pure fused silica and also gives the cladding layer a somewhat higher thermal coefficient of expansion than pure fused silica, thereby providing a better match between the coefficients of expansion of the core and cladding materials.

Figure 3:
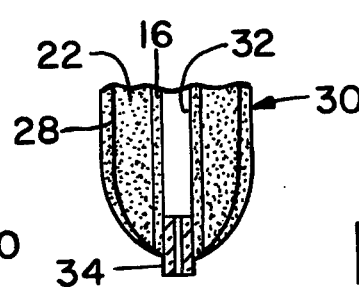
FIG. 3 is a cross-sectional view of the end of a porous preform prior to consolidation.

After deposition of particulate soot material to the extent required to form preform 30, mandrel 20 may be removed from the assembly by pulling it out through handle 10, thereby leaving a longitudinal aperture 32, as shown in FIG. 3. Integral handle 10 provides a support for subsequent handling and processing.

The ground glass joint portion of handle 10 is secured into a complimentary female ground glass joint member, whereby drying gas may be flowed through handle 10, into the preform aperture and outwardly through the preform interstices. The steps of drying and consolidating may be performed in accordance with the teachings of U.S. Pat. No. 4,125,388, which patent is hereby expressly incorporated by reference. As taught by said patent, drying may be accomplished before or during the consolidation step.

Drying can be facilitated by inserting a short section 34 of capillary tubing into that end of the porous preform aperture 32 opposite handle 10. The capillary tubing 34 initially permits some of the drying gas to flush water from the central region of the preform. As the porous preform is inserted into the consolidation furnace, the capillary tubing aperture closes, thereby causing all drying gas to thereafter flow through the preform interstices.

For certain core compositions, conventional soot deposition techniques result in a devitrified layer on the aperture-forming surface. If such a surface exists in the consolidated preform, a fiber drawn therefrom will contain seeds unless the devitrified layer is removed from that surface prior to the time that the aperture is closed. The aperture surface is preferably etched to remove the devitrified layer, and thereafter rinsed and dried before the aperture is sealed. If a capilliary tube has sealed the end of the aperture during consolidation, the sealed end 44 (see FIG. 4) should be severed prior to etching. After the sealed end has been severed, aperture 42 extends through the entire preform and handle. After drying gas is flowed through the aperture, that portion of the aperture at preform end 44 is again closed, the aperture is evacuated, and the other end 48 is heated and closed. In processes wherein the aperture remains open to the atmosphere, the exposed aperture surface can be contaminated by OH-ions or other absorption impurities which can diffuse into the aperture-forming surface while it is subjected to high temperature during drawing. Since aperture 42 is evacuated and closed, it cannot be contaminated in this manner.

Figures 4, 5:
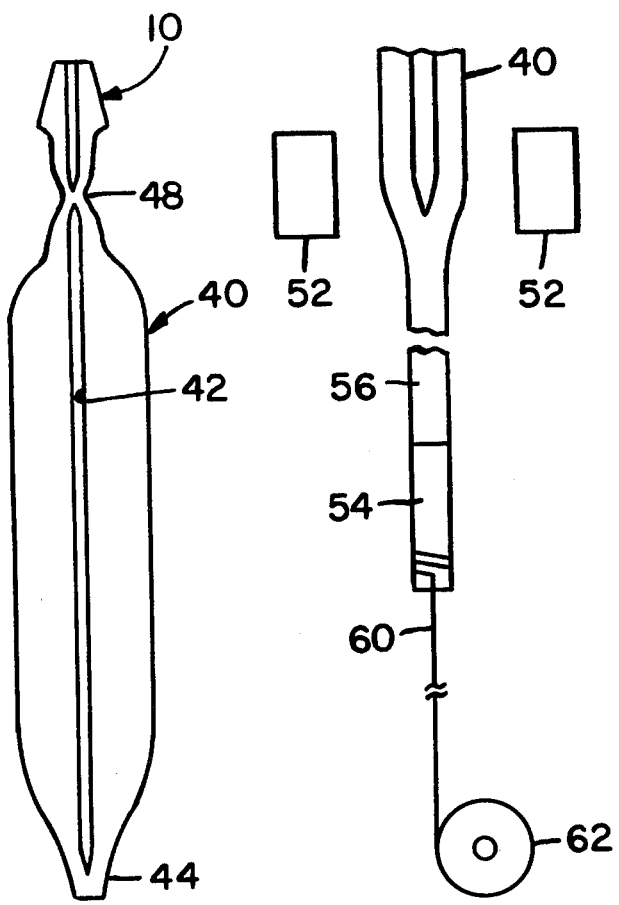
FIG. 4 is a cross-sectional view of a consolidated glass preform after the aperture has been evacuated and closed at both ends.
FIG. 5 is a schematic diagram illustrating the drawing of a rod or intermediate fiber from the preform.

If the core composition is not one that devitrifies during the consolidation process, the aperture forming surface 32 may not need to be etched. It is thought that the surface of aperture 42 would not devitrify during consolidation if the composition of stratum 16 was 15 wt. % $P_2O_5$, 6 wt. % $GeO_2$ and 79 wt. % $SiO_2$. The composition of coating 22 could be 10 wt. % $GeO_2$, 90 wt. % $SiO_2$ and that of cladding coatings 28 and 70 pure $SiO_2$. If these compositions were employed, aperture 42 would remain open. Thus, if end 44 of preform aperture 42 closes during consolidation, as shown in FIG. 4, it can remain closed. If no plug 34 is employed, the entire aperture will remain open. In this event end 44 must be closed after consolidation by a technique such as heating and pinching the same. The aperture is then evacuated through handle 10, and the other end 48 is heated and closed.

If the resultant consolidated preform is drawn directly into an optical waveguide fiber, the low pressure within the aperture will assist in the closing thereof. Alternatively, the resultant preform may be provided with additional cladding material prior to drawing the optical waveguide fiber. Various well known techniques are available for providing additional cladding material. For example, it may be added by a flame oxidation process as taught in U.S. Pat. No. 3,775,075 or the consolidated preform may be inserted into a tube of cladding material, the composite being drawn into an optical waveguide fiber. If additional cladding is to be provided, it is preferred that the consolidated preform be first drawn into an intermediate, large diameter fiber which is thereafter provided with additional cladding.

The intermediate fiber can be formed in a conventional draw furnace wherein the tip of the consolidated preform from which the intermediate fiber is being drawn is heated to a temperature which is slightly lower than the temperature to which the preform would be subjected to draw optical fiber therefrom. A temperature of about 1900° C. is suitable for a high silica content preform. A suitable method for forming an intermediate fiber is illustrated in FIG. 5. Preform 40 is mounted in a conventional draw furnace where the tip thereof is heated by a carbon resistance heater 52. A glass rod 54 may be attached to the bottom of preform 40. A cord 60 is tied to rod 54. Cord 60 is wound upon a motordriven capstan 62, thereby causing the intermediate fiber 56 to be drawn at a suitable rate, a rate of 15 to 23 cm/min having been found to be adequate. As the intermediate fiber is drawn, the aperture readily closes since the pressure therein is low relative to ambient pressure. The aperture may close somewhat flat whereby the core roundness of the resultant fiber may be adversely affected. The core of the resultant fiber will not be unacceptably out of round if the core-clad ratio of intermediate fiber 56 is sufficiently high and if the intermediate fiber is employed as the central region upon which additional cladding is added in the formation of a single-mode or a multimode fiber. The diameter of an intermediate fiber that is to be employed as a mandrel upon which cladding soot is to be deposited is preferably in the range of 4 to 10 mm. It is noted that core roundness should be satisfactory even if the preform 40 is drawn directly into an optical fiber, provided that the core-clad diameter ratio of the resultant fiber is sufficiently high. That aspect of the invention whereby the final draw blank is formed in a two-step process involving the formation of an intermediate fiber results in less tensile stress in the inner core region of the consolidated preform. The ratio of the core diameter to cladding diameter in preform 40 is larger than the value necessary to achieve the desired core diameter in the resultant fiber. This results in a lower tensile stress in the inner core region of consolidated preform 40. When intermediate fiber 56 is formed, aperture 42 closes, thereby burying the surface at which breakage would have been initiated.

Figure 6:
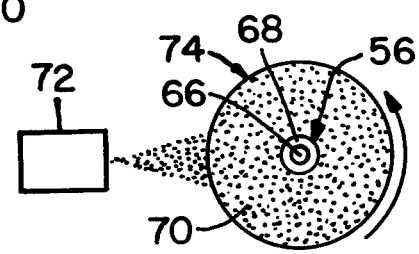
FIG. 6 illustrates the application of an outer cladding to the intermediate fiber.

The embodiment wherein intermediate fiber 56 is provided with an additional coating of cladding soot is illustrated in FIG. 6. Intermediate fiber 56, which comprises core region 66 and cladding region 68, is employed as a starting member upon which coating 70 is deposited by burner 72. Coating 70 is generally formed of the same material as the cladding portion 68 of intermediate fiber 56.

The resultant composite preform 74 is preferably consolidated to form a solid glass draw blank which is thereafter drawn into an optical fiber. During the consolidation process, composite preform 74 is gradually inserted into a furnace through which a consolidation atmosphere flows. The atmosphere preferably contains helium and an amount of chlorine sufficient to dry the soot prior to the time that consolidation occurs. About 5 vol. % chlorine is usually sufficient. If chlorine is not used during this consolidation process, relatively high attenuation will be evident at 950 nm and 1400 nm.

The following specific example illustrates the manner in which the method of the present invention can be employed to produce an optical waveguide fiber. An integral handle of the type disclosed in U.S. Pat. No. 4,289,522 was employed. A tapered alumina mandrel was inserted into the handle, the central region where soot particles were ultimately deposited being tapered from about 5.5 mm to 6.5 mm. The burner was located 13.7 cm from the mandrel. Liquid $SiCl_4$ and liquid $GeCl_4$ was maintained at 37° C. in first and second containers, respectively. The burner traversed a 49 cm section of mandrel in 25 seconds. An acetylene torch supported on the burner was first employed to deposit carbon particles on the mandrel during three burner passes. Silica soot having a thickness of about 1 mm was then deposited on the mandrel during five burner passes during which time oxygen flowed through the first container at a rate of 1.4 slpm. During the next 58 minutes oxygen was bubbled through the second container at a rate of 0.3 slpm while the flow rate of oxygen to the first container remained unchanged. Thus, a step-index core region of $SiO_2$ doped with 10 weight percent $GeO_2$ was deposited to a thickness of about 12 mm. The flow of oxygen to the second container was then stopped while the rate of oxygen flow to the first container remained at 1.4 slpm for 270 minutes during which time $SiO_2$ soot was deposited to form the cladding region of the soot preform, the outer diameter of which was 60 mm.

The soot preform was removed from the lathe, and the mandrel was removed therefrom, the integral handle remaining at one end thereof. A short section of capillary tubing was inserted into that end of the preform aperture opposite the handle. The preform was then simultaneously dryed and consolidated in accordance with the teachings of U.S. Pat. No. 4,125,388. A drying gas consisting of 5 volume percent chlorine, the balance being helium, was flowed through the handle and into the preform aperture. A portion of this drying gas initially flowed through the capillary plug carrying with it water vapor along with reaction products from the drying reaction. As the preform was lowered into the consolidation furnace, through which a helium flushing gas was flowing, the opening in the capillary tube became sealed, and the preform was subjected to gradient consolidation.

After the consolidated preform was cooled, the tip containing the capillary plug was removed so that the aperture extended entirely through the preform. The preform was then acid etched for 4 hours in a 50% HF bath which was maintained at 23° C. During this time it was repeatedly immersed and removed from the bath. During this etching step, a very thin layer of devitrified $SiO_2$ was removed from the aperture-forming surface of the preform. The preform was then rinsed in filtered, deionized water and was permitted to dry at room temperature. Since some water remained on the aperture-forming surface, a drying gas mixture comprising 5 volume percent chlorine and 95 volume percent helium was supplied to the handle at about 1.5 psi and was flowed through the aperture.

The consolidated preform was then immediately inserted into a lathe and a torch was directed at the end thereof opposite the handle. The softened glass was then pinched to close the aperture at region 44. The aperture was then evacuated through the handle. When the flame from a small torch was directed at the central region of the handle portion the aperture was quickly drawn shut to form pinched region 48.

The preform was then inserted into a draw furnace, and a cord was attached thereto. The bottom tip of the preform was heated to about 1900° C. while the cord pulled downwardly on the preform at a rate of about 15 cm/min. The diameter of the resultant intermediate fiber was about 5 mm. After the intermediate fiber had been drawn to a length of about 3 m, it was broken from the preform and severed into sections about 89 cm long. The cord was reattached to the bottom of the undrawn portion of the preform, and the remainder of the preform was drawn into intermediate fiber.

Each of the sections of intermediate fiber was then subjected to the following steps. A section of intermediate fiber was supported in the lathe where it functioned as a mandrel for the deposition of cladding soot. Oxygen flowed through the first container at a rate of 1.6 slpm, and the burner traversed the intermediate fiber at a rate of about 2 cm/sec. This was continued until a layer of $SiO_2$ having an outside diameter of 60 mm was deposited.

Figure 7:
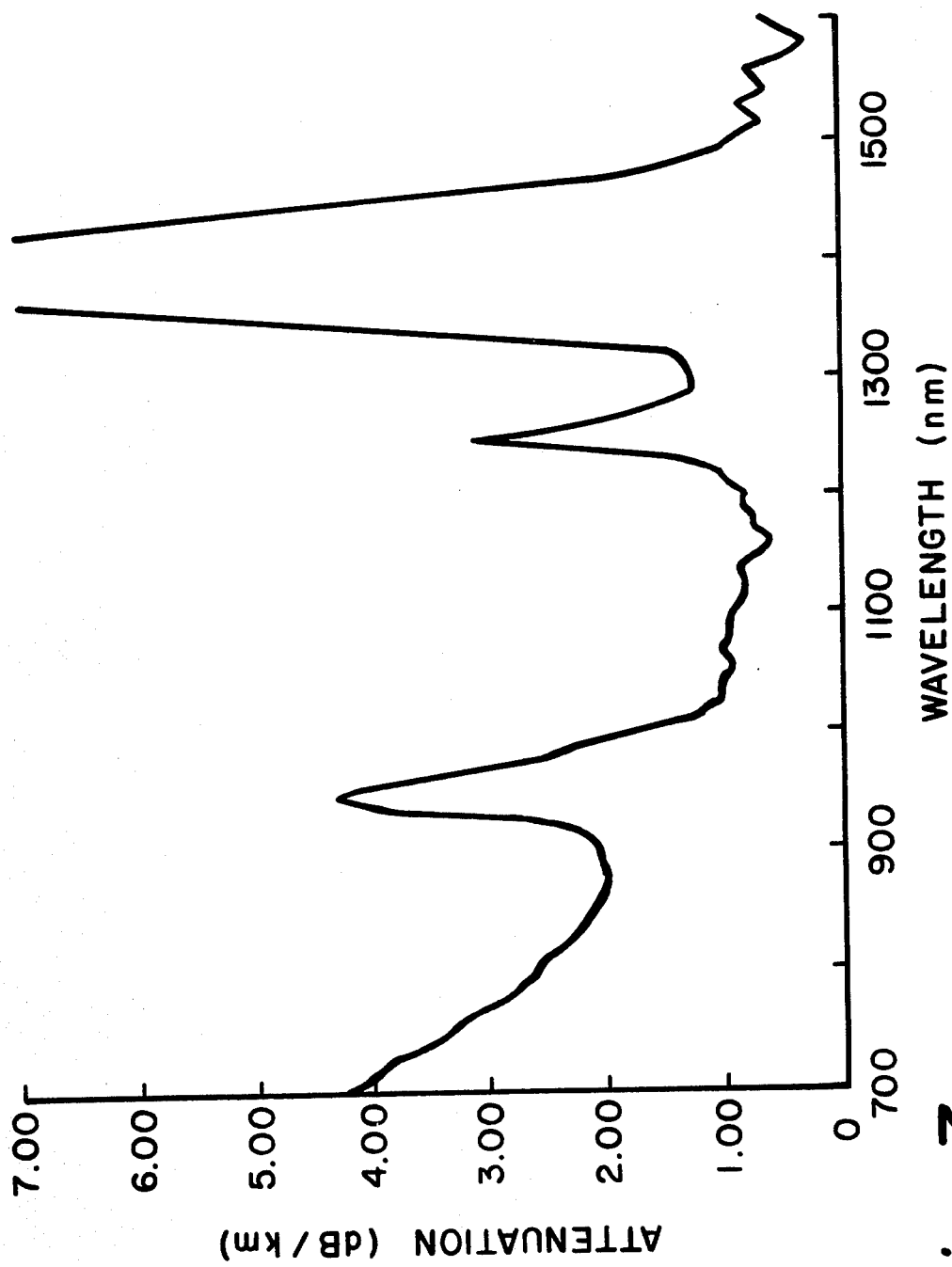
FIG. 7 is a spectral attenuation curve of an optical waveguide formed in accordance with the method of the present invention.

The resultant final preform was gradually inserted into a consolidation furnace having a maximum temperature of 1450° C. where it was consolidated while helium flowed upwardly through the furnace. The resultant optical waveguide preform, the diameter of which was about 35 mm, was inserted into the draw furnace where the tip thereof was subjected to a temperature of about 2100° C. The resultant step-index, single-mode optical waveguide fiber had a core diameter of about 8 $\mu$m and an outside diameter of 125 $\mu$m. The spectral attenuation curve for this fiber is shown in FIG. 7. The peaks at about 950 nm and 1400 nm are indicative of a water content of about 3 ppm.

I claim:

1. A method of forming a high purity glass article comprising the steps of
   providing a substantially cylindrical mandrel,
   applying at least one coating of particulate glass to the outside peripheral surface of said mandrel, removing said mandrel to form a porous preform having an aperture therein,
   heating said porous preform to form an elongated, consolidated glass preform having a longitudinal aperture therethrough,
   closing one end of said aperture,
   evacuating said aperture, and
   closing the remaining end of said aperture, the entire expanse of said aperture between said ends remaining open to form the high purity glass article.

2. The method of claim 1 wherein, prior to the step of closing one end of said aperture, said method includes the step of removing the surface portion of the aperture forming wall of said consolidated preform.

3. The method of claim 2 wherein the step of removing comprises etching and rinsing the surface of said aperture-forming wall, and flowing a drying gas through said aperture.

4. The method of claim 3 further comprising the steps of heating at least one end of said formed glass article and drawing to close said aperture and reduce the diameter of said formed glass article.

5. The method of claim 4 wherein the step of drawing is characterized in that it comprises drawing an intermediate, large diameter fiber, said method further comprising the step of adding cladding material to said intermediate fiber and drawing the resultant composite article to form an optical waveguide fiber.

6. The method of claim 5 wherein the step of adding cladding material comprises inserting said intermediate fiber into a tube of cladding glass.

7. The method of claim 4 wherein the step of drawing comprises drawing said formed glass articles to an intermediate fiber having a thickness sufficient that it can be employed as a mandrel upon which particulate glass can be deposited, said method further comprising the steps of depositing a layer of particulate cladding glass on at least a portion of said intermediate fiber.

8. The method of claim 7 wherein the step of drawing to form an optical waveguide fiber comprises heating the composite article comprising at least a portion of said intermediate fiber and said layer of particulate cladding glass to simultaneously consolidate said particulate cladding glass and reduce the diameter of the combination of said intermediate fiber and the consolidated cladding glass thereon.

9. The method of claim 1 wherein, during the step of heating, said one end becomes closed, said method further comprising the steps of severing said closed end and removing the surface portion of the aperture forming wall of said consolidated preform prior to the step of closing one end of said aperture.

10. The method of claim 1 wherein, prior to the step of heating, said method comprises inserting a capilliary tube into one end of said aperture and flowing a drying gas into the remaining end of said aperture, said capilliary tube closing during the step of heating.

11. The method of claim 10 further comprising the step of severing the end of said preform containing said closed capilliary tube, etching and rinsing the surface of said aperture-forming wall and flowing drying gas through said aperture.

12. A method of forming a high purity glass article comprising the steps of providing a substantially cylindrical mandrel, applying to said mandrel a stratum of particulate glass having a relatively low coefficient of expansion, applying a first coating of particulate glass to the outside peripheral surface of said stratum, the coefficient of expansion of said first coating being greater than that of said stratum, applying a second coating of particulate glass over the outside peripheral surface of said first coating, said second coating having a refractive index less than that of said first coating, removing said mandrel to form a porous preform having an aperture therein, heating said porous preform to form an elongated, consolidated glass preform having a longitudinal aperture therethrough, etching a surface portion of said stratum glass from the aperture-forming wall of said consolidated preform, rinsing the aperture-forming wall of said preform, flowing a drying gas through said aperture, closing one end of said aperture, evacuating said aperture, closing the remaining end of said aperture, heating at least one end of said consolidated preform and drawing to close said aperture and reduce the diameter of said consolidated preform, thereby forming a large diameter, intermediate fiber, adding cladding material to said intermediate fiber, and drawing the composite article so formed into an optical waveguide fiber.

13. The method of claim 12 wherein the step of adding cladding material comprises depositing a layer of particulate cladding glass on at least a portion of said intermediate fiber, and consolidating said layer of particulate cladding glass on the surface of said intermediate fiber.

* * * * *